United States Patent [19]
Frohlich

[11] 3,741,522
[45] June 26, 1973

[54] GATE VALVE
[75] Inventor: Karl Heinrich Frohlich, Rohrbach/Saar, Germany
[73] Assignee: Th. Jansen G.m.b.H., Rohrbach/Saar, Germany
[22] Filed: June 10, 1971
[21] Appl. No.: 151,678

[30] Foreign Application Priority Data
June 12, 1970 Germany.................. P 20 29 146.7

[52] U.S. Cl.................. 251/159, 251/197, 251/170, 251/327
[51] Int. Cl............................................. F16k 3/10
[58] Field of Search................... 251/159, 170, 187, 251/175, 168, 169, 197, 198, 196

[56] References Cited
UNITED STATES PATENTS
3,547,140  12/1970  Hastings.......................... 251/187 X
1,475,731  11/1923  Windett.......................... 251/187 X FOREIGN PATENTS OR APPLICATIONS
1,020,332  11/1952  France.............................. 251/159

Primary Examiner—Harold W. Weakley
Attorney—Sughrue, Rothwell, Mion, Zinn and Macpeak

[57] ABSTRACT

A gate valve in which four shifting devices, driven in pairs, engage the four corners of a rectangular frame. The latter transmits force, through eight force-transmitting points, namely two points per frame side, to a pressure applying pipe which is axially movable and adapted to lock the gate in position or release it. The eight points are evenly spaced about the periphery of the pressure-applying pipe so that the forces are distributed in an excellent manner on the gate.

3 Claims, 5 Drawing Figures

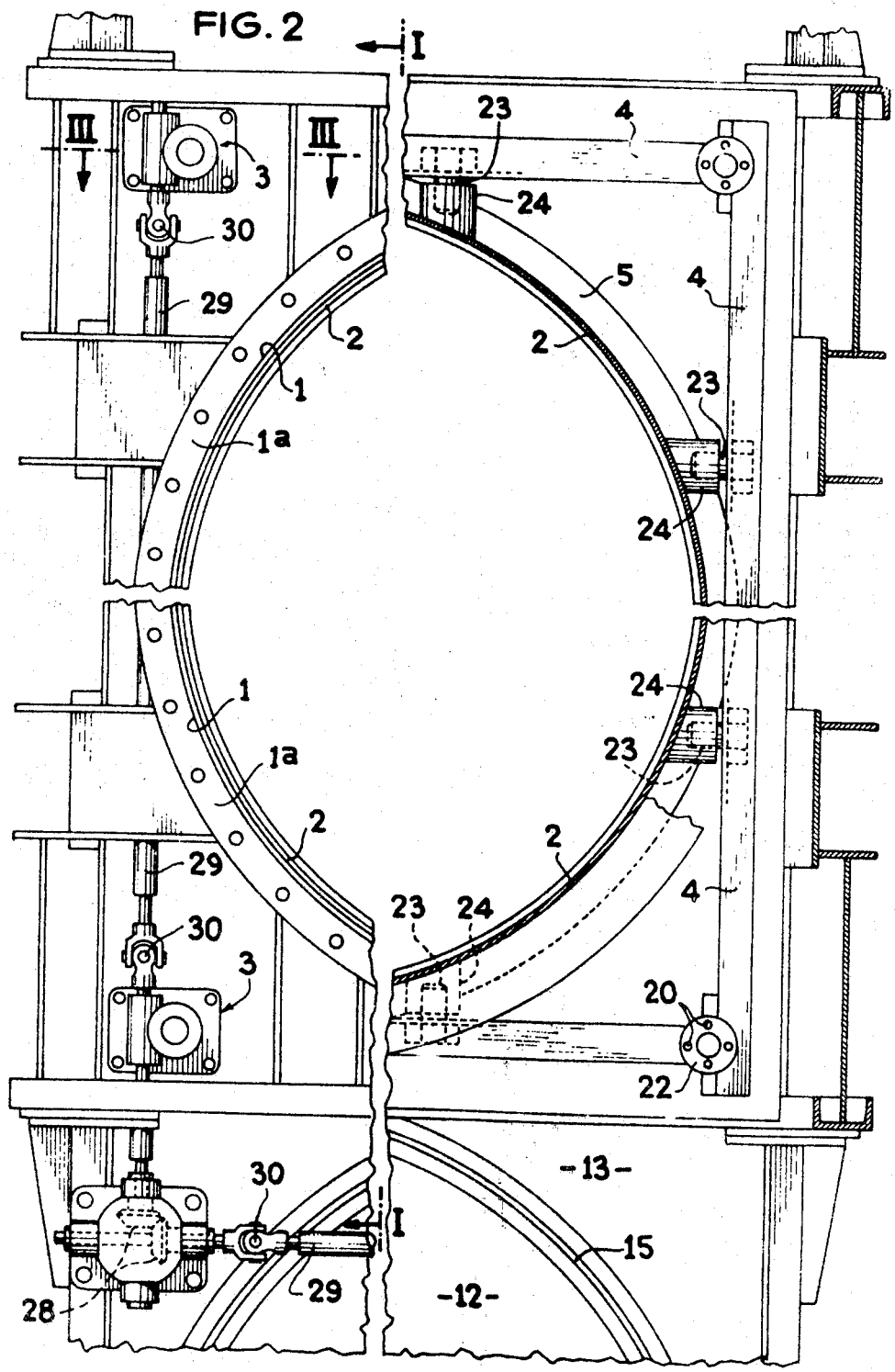

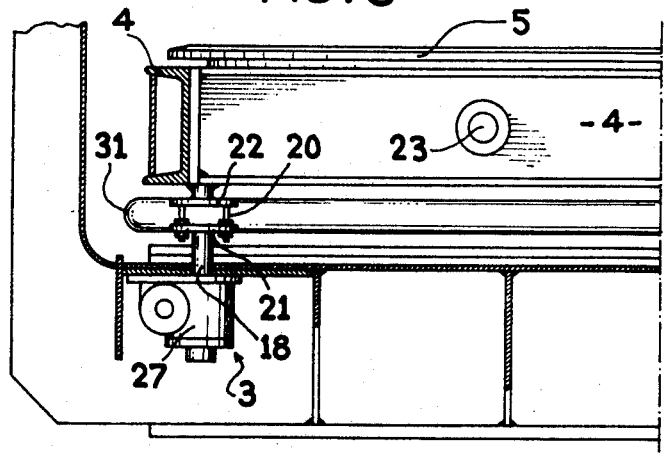
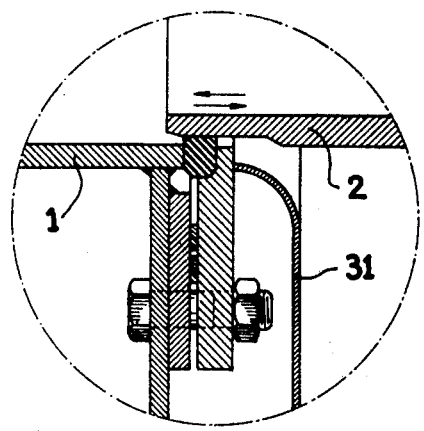
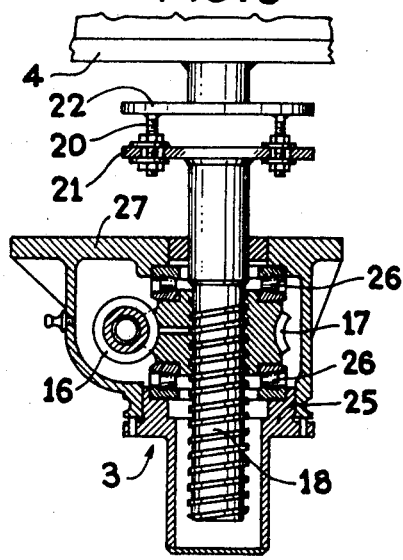

GATE VALVE

The present invention concerns a gate valve constituting closing means whose gate can be shifted from the opening position to the closing position and vice versa by sliding or rotating it between two sealing rings, one of which may be applied against and moved away from the gate, and is connected, at points located symmetrically with respect to its centre, to a polygonal frame on the corners of which act automatically-locked shifting devices for applying the sealing ring against the gate through the medium of the frame.

In a known gate valve of this type, for example that disclosed in the U.S. Pat. No. 2,707,494, the automatically-locked shifting devices employed are screwthreaded shafts connected to blocks which are rotated by chains.

This arrangement has only one force transmitting point between the frame and the sealing ring on each side of the frame which is triangular. It may be suitable for pipes of relatively small diameter but not the large diameter pipes employed at the present time. Indeed, with such pipes a single force-transmitting point between the frame and the sealing ring on each side of the frame is insufficient. Moreover, the chains may bend, which does not always ensure the alternating movement of the automatically-locked shifting devices. Further, this construction is unsuitable for a valve in a vertical conduit, especially of large nominal diameter, owing to the inevitable bending of the chains.

The invention has for purpose to obtain, by the application of this known arrangement, an increased pressure of application by increasing the number of transmission points between the frame and the sealing ring and to overcome the drawbacks resulting from the utilization of shifting means consisting of screwthreaded shafts, blocks and chains.

The invention provides an improved gate valve comprising a rectangular frame, and two force-transmitting points which are disposed on each of the four sides of the frame between the corners of the frame and located on the periphery of the movable ring symmetrically with respect to the centre of the movable ring; and automatically-locked shifting devices acting on the corners of the frame and comprising worm-drive emchanisms driven in pairs by bevel gears which are driven by common drive means.

Owing to the transmission of force at two points on each side of the frame, the rectangular frame according to the invention therefore has only one corner more than the triangular frame of known type, whereas the number of force-transmitting points is double that of the corners of the frame, namely eight as against three in the known device.

Owing to the fact that the worm-drive shifting devices are coupled in pairs and the bevel gears are also coupled in pairs, it is possible to adjust the shifting devices with respect to each other and adjust the bevel gears of each pair so that the torsions of the connecting means can be calculated and compensated.

Further features and advantages of the invention will be apparent from the ensuing description with reference to the accompanying drawings.

In the drawings:

FIG. 2 is a front elevational view of the valve, partly in section taken along line II—II of FIG. 1;

FIG. 3 is a partial sectional view taken along line III—III OF FIG. 2;

FIG. 4 is a view of a detail of the valve surrounded by the circle IV in dot-dash line in FIG. 1, and FIG. 5 is a sectional view of a commercially available worm-drive mechanism of utility for actuating the valve according to the invention.

Figure 1:
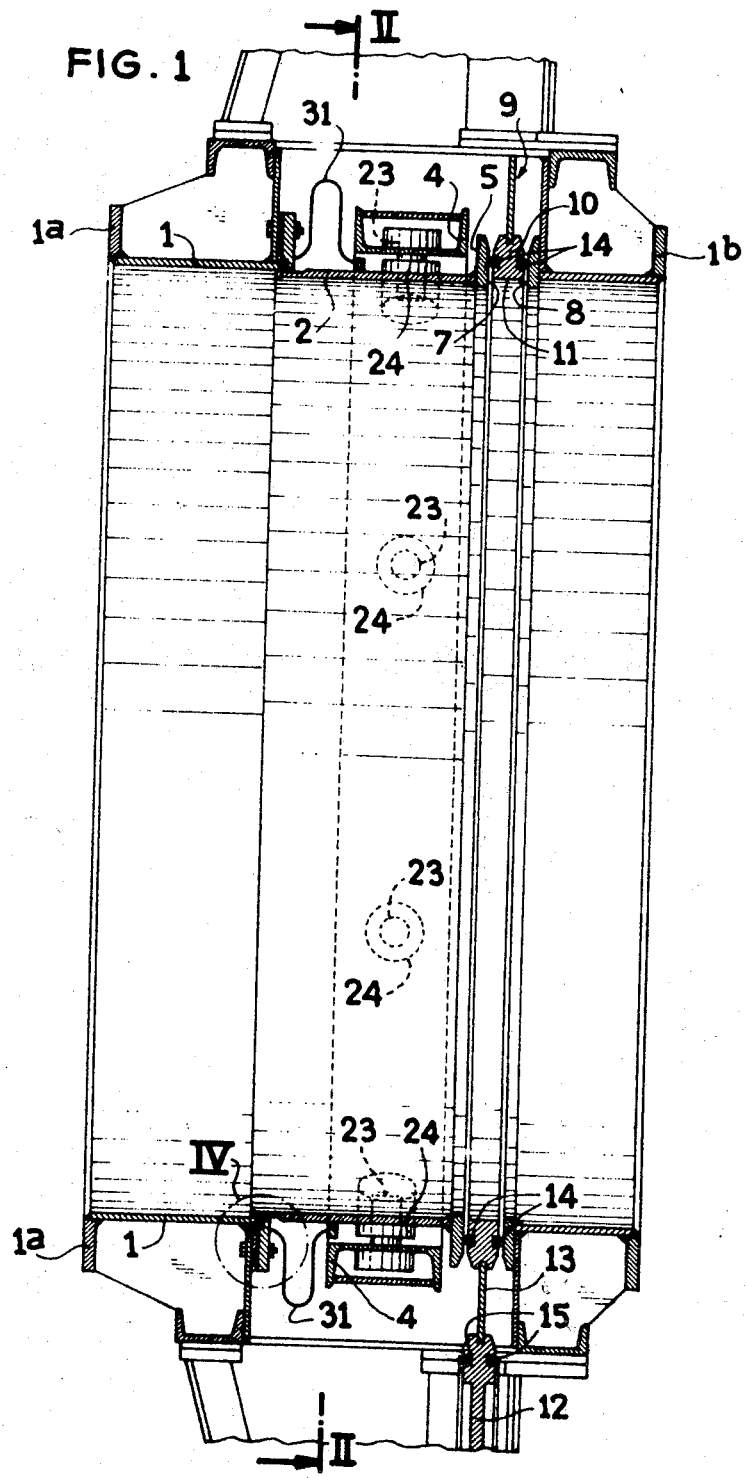
FIG. 1 is a sectional view, taken along line I—I of FIG. 2, of a gate valve according to the invention.

In the illustrated embodiment, the valve comprises a body 1 which has two end portions defining passages at both ends and has a fixed overall length. Flanges $1^1$, $1^b$ on the body 1 enable it to be connected between two adjacent pipe or conduit sections. Disposed in this body is a section of a movable pipe or sleeve 2, termed a pressure sleeve and capable of being shifted axially by means of four shifting devices 3 which are supported at the four corners of a frame 4 of rectangular shape, namely square in the presently-described embodiment. The frame 4 is adapted to shift a flange 5 of the movable pipe 2 with respect to a right end portion of the body 1 as will be explained hereinafter.

The face 7 (FIG. 1) of the flange 5 of the pipe 2 and a facing face 8 on the right end portion (as viewed in FIG. 1) of the body 1 are arranged in the form of machined bearing faces constituting sealing rings. One of these bearing faces is therefore fixed and the other is movable.

A gate 9 is disposed between the sealing ring faces 7 and 8 and closes the conduit after having been introduced into the body 1 and axially clamped against the pressure pipe 2. The gate 9 can be shifted between the separated sealing faces 7 and 8 when the pressure pipe is unclamped. The gate 9 comprises two elements: a rim 10 having a circular opening 11 and a solid wall 12. These two elements are mounted in a common retaining sheet 13 which can be displaced by a drive device in such manner that either the solid wall 12 or the opening of the rim 10 are in the passage defined by the body 1. Elastically yieldable sealing elements 14, 15 are embedded on each side in the facing faces of the rim 10 and solid wall 12. These sealing elements are interchangeable in valve service, since they are always accessible on one side of the body, whether it concerns the solid wall 12 or the rim 10.

FIG. 5 shows in detail one embodiment of one of the four devices 3 adapted to drive or shift the pressure pipe 2 in either direction for clamping or unclamping the flange 5 relative to the gate. Each of these devices is a worm-drive reducing mechanism having a worm 16, a wormwheel 17 and a screwthreaded shaft 18. The device is connected through its screwthreaded shaft 18 to the force-applying frame 4. A precise regulation can be effected for each shifting device 3 by means of bolts 20 (or set screws) which are combined with two plates, the plate 21 being integral with the shaft 18 and the other plate 22 secured to the frame 4 (FIGS. 3 and 5). The frame 4 acts on the flange 5 through the movable pressure pipe 2 at eight points which are arranged symmetrically in pairs on each side of the frame 4. Each of the force-transmitting points has, for example, a pin 23 carried by the frame 4 and engaged in a boss 24 which is fixed to the sleeve 2 by welding or other means.

In each shifting device 3, the screwthreaded shaft 18, which is prevented from rotating by its connection to the frame 4, has its end covered by a cover 25 which is adjustable so as to determine the axial play of the supporting rolling bearings 26. The cover 25 is lockable in position by two stop screws.

The bearings 26 disposed on each side of the wormwheel 17 are adapted to absorb in an alternating manner the tension or compression forces exerted by the screwthreaded shaft 18.

In its usual commercial construction, the wormwheel 17 is of aluminium-bronze and has precision-machined teeth, which ensures a good meshing and excellent sliding qualitities. Advantageously, the worm 16 can be of treated steel. The assembly is surrounded by a housing 27 which may be advantageously of cast iron.

Shifting devices of the worm-drive type are well known and employed in various forms. In the present application, the worms 16 of these devices 3 are driven through two drive-distributing bevel gears 28 which are connected by spindles 29 to universal joints 30. The uniform motion of the spindles and universal joints results in absolute synchronism in the valve operation.

The gears 28 can be driven by hand, or by an electric servomotor, driving one of the spindles.

The shifting devices 3 and the gears 28 are outside the body of the valve and are readily accessible and therefore may be easily serviced.

All the universal joints can be protected from water and dust by gaiters.

To bring the valve from the open position to the closed position or vice versa three operations are necessary:

a. the pressure pipe 2 must be unclamped by the action of the four shifting devices 3;
b. the gate 9 is shifted to the valve opening or closing position electrically, manually or hydraulically;
c. the pressure pipe 2 is clamped by means of the four shifting devices 3.

It will be understood that the valve can be provided with a gastight housing and it is advantageous that the replacement of the sealing elements 14, 15 merely require the removal of two covers.

The described embodiment shows that, by means of four shifting devices 3 and a rectangular frame 4, it is possible to achieve eight force-transmitting points (23,24) for the pressure pipe 2 so that the pressure of application is exerted at equal distances throughout the periphery of the annular surface which must be closed in a fluidtight manner.

As shown in FIGS. 1,3 and 4, the force-transmitting points between the frame and the pressure pipe 2 can be completed by additional elastically yieldable means or bellows 31 known per se (as disclosed in the German Pat. No. 1,208,961)

Having now described my invention what I claim and desire to secure by Letters Patent is:

1. In a gate valve comprising a rigid body structure having an axis and an annular end portion defining an axial passage, a first sealing ring fixed relative to the end portion, a second sealing ring in axially spaced relation to the first sealing ring, a pressure sleeve coaxial with and movable relative to the passage and fixed relative to the second sealing ring, a gate movable between a passage opening position and a passage closing position between the two sealing rings, and shfiting means for selectively applying said second sealing ring against the gate and shifting the second sealing ring away from the gate; the feature that said shifting means comprise in combination a rectangular frame having four corners and four integral side members defining an opening in which the sleeve is located, the side members being adapted and arranged to have substantially optimum stiffness, for a given volume of the material of the side members, in longitudinal planes of the side members parallel to said axis so as to minimize warping of the frame when applying the second sealing ring against the gate, eight connecting means connecting the frame to the sleeve so as to be capable of rigidly transmitting movement of the frame to the sleeve axially of said passage, pairs of the connecting means being disposed on each of the four side members of the frame in spaced relation to the corners of the frame and the eight connecting means being arranged on the periphery of the sleeve symmetrically with respect to said axis, four shifting devices respectively interposed between the body structure and the corners of the frame and comprising worm-drive mechanisms, and cardan shaft means for driving the worm-drive mechanisms in synchronism and forcefully applying the second sealing ring against the gate.

2. In a gate valve comprising a body structure having an axis and a first end portion and a second end portion, the end portions being in rigidly fixed axial positions and defining passages aligned on said axis and being adapted to be fixed to pipe sections between which the valve is to be inserted, a first sealing ring fixed relative to the first end portion, a second sealing ring in axially spaced relation to the first sealing ring, a pressure sleeve interposed between the two end portions and coaxial with and axially movable relative to the passages and fixed relative to the second sealing ring, a gate movable between a passage opening position and a passage closing position between the two sealing rings, and shifting means for selectively applying the second sealing ring against the gate and shifting the second sealing ring away from the gate; the feature that the shifting means comprise in combination: a rectangular frame having four corners and four integral side members which define an opening in which the sleeve is located, the side members being adapted and arranged to have substantially optimum stiffness, for a given volume of the material of the side members, in longitudinal planes of the side members parallel to said axis so as to minimize warping of the frame when applying the second sealing ring against the gate, eight connecting means connecting the frame to the sleeve so as to be capable of rigidly transmitting movement of the frame to the sleeve axially of said passages, pairs of the connecting means being disposed on each of the four side members of the frame in spaced relation to the corners and the eight connecting means being arranged on the periphery of the sleeve symmetrically with respect to said axis, four drive means respectively interposed between the body structure and the four corners of the frame for forcefully applying the second sealing ring against the gate and means for driving the four drive means in synchronism.

3. A valve as claimed in claim 2, further comprising elastically yieldable sealig means interposed between and connected to the body structure and the pressure sleeve.

* * * * *